United States Patent
Furuta

(10) Patent No.: US 10,955,007 B2
(45) Date of Patent: Mar. 23, 2021

(54) BEARING RETAINING MECHANISM

(71) Applicant: Nabtesco Corporation, Tokyo (JP)

(72) Inventor: Kazuya Furuta, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/540,895

(22) Filed: Aug. 14, 2019

(65) Prior Publication Data

US 2020/0056650 A1     Feb. 20, 2020

(30) Foreign Application Priority Data

Aug. 15, 2018   (JP) .............................. JP2018-152983
Aug. 8, 2019    (JP) .............................. JP2019-146842

(51) Int. Cl.
| | |
|---|---|
| *F16C 35/07* | (2006.01) |
| *F16H 1/32* | (2006.01) |
| *F16C 35/077* | (2006.01) |

(52) U.S. Cl.
CPC .............. *F16C 35/077* (2013.01); *F16H 1/32* (2013.01)

(58) Field of Classification Search
CPC ........ F16C 35/077; F16C 43/04; F16C 43/06; F16C 33/605; F16H 1/32; F16H 2001/323; F16H 2001/327; F16H 57/08; F16H 57/023

See application file for complete search history.

(56) References Cited

U.S. PATENT DOCUMENTS

| | | | | |
|---|---|---|---|---|
| 5,059,041 A | * | 10/1991 | Watanabe ............... | F16C 19/52 384/476 |
| 5,857,782 A | * | 1/1999 | Waskiewicz .......... | F16C 23/084 384/493 |
| 2002/0125778 A1 | * | 9/2002 | Obara ..................... | F16C 19/54 310/90 |
| 2004/0045431 A1 | * | 3/2004 | Schmitt ................. | F16C 19/466 92/129 |

FOREIGN PATENT DOCUMENTS

| | | |
|---|---|---|
| DE | 102015222809 A1 | 5/2016 |
| DE | 102016200242 A1 | 7/2016 |
| JP | 2016-130536 A | 7/2016 |

OTHER PUBLICATIONS

Extended European Search Report dated Jan. 17, 2020 issued in corresponding EP Application No. 19191773.1.

* cited by examiner

*Primary Examiner* — Alan B Waits
(74) *Attorney, Agent, or Firm* — Pillsbury Winthrop Shaw Pittman, LLP

(57) ABSTRACT

One object is to reduce an effect of fastening of a restriction member, thereby to increase durability of a bearing retaining mechanism. The present invention relates to a bearing retaining mechanism. A bearing retaining mechanism according to an embodiment includes: a first member having an inner peripheral surface including an internal screw portion; a second member disposed on the inner peripheral surface; a rolling member configured to roll on a rolling surface formed on the second member; a crankshaft rotatably supported on the second member via the rolling member; and a restriction member supported on the first member and the second member, the restriction member including an external screw portion screwed on the internal screw portion of the first member.

3 Claims, 3 Drawing Sheets

BEARING RETAINING MECHANISM

CROSS-REFERENCE TO RELATED APPLICATIONS

This application is based on and claims the benefit of priority from Japanese Patent Application Serial No. 2018-152983 (filed on Aug. 15, 2018) and Japanese Patent Application Serial No. 2019-146842 (filed on Aug. 8, 2019), the contents of which are hereby incorporated by reference in their entirety.

TECHNICAL FIELD

The present invention relates to a bearing retaining mechanism. In particular, the present invention relates to a bearing retaining mechanism that can be used in a gear device such as a speed reducer.

BACKGROUND

There is known a gear device that rotatably supports a crankshaft in a through-hole formed in a carrier.

A conventional gear device is disclosed in Japanese Patent Application Publication No. 2016-130536 ("the '536 Publication"). In the gear device disclosed in the '536 Publication, an external screw portion of a restriction member is screwed on an internal screw portion of a carrier to fix the restriction member to the carrier, and the restriction member fixed to the carrier restricts the movement of a crankshaft in the axial direction.

In conventional gear devices as disclosed in the '536 Publication, an external screw portion of a restriction member is screwed on an internal screw portion of a carrier to fix the restriction member to the carrier, and the restriction member restricts the movement of a crankshaft in the axial direction.

However, when the restriction member is fastened to the carrier, the fastening torque causes reduction in circularity or cylindricity of a rolling surface (also referred to as a crank hole) for rolling members. When the rolling members roll on the rolling surface with reduced circularity or cylindricity, the rolling surface may be broken.

SUMMARY

The present invention addresses the above drawback, and one object thereof is to reduce the effect of fastening of the restriction member to increase durability of a bearing retaining mechanism.

A bearing retaining mechanism according to an embodiment of the present invention comprises: a first member having an inner peripheral surface including an internal screw portion; a second member disposed on the inner peripheral surface; a rolling member configured to roll on a rolling surface formed on the second member; a crankshaft rotatably supported on the second member via the rolling member; and a restriction member supported on the first member and the second member, the restriction member including an external screw portion screwed on the internal screw portion of the first member.

A bearing retaining mechanism according to an embodiment of the present invention comprises: a first member having an inner peripheral surface including an internal screw portion; a second member disposed on the inner peripheral surface; a rolling member configured to roll on a rolling surface formed on the second member; a crankshaft rotatably supported on the second member via the rolling member; and a restriction member supported on the first member, the restriction member including an external screw portion screwed on the internal screw portion.

In an embodiment of the present invention, the second member is disposed so as to leave a gap between the second member and the restriction member.

In an embodiment of the present invention, the second member is a bush.

ADVANTAGES

In a bearing retaining mechanism according to an embodiment of the present invention, it is possible to reduce the effect of fastening of the restriction member, thereby to increase durability of the bearing retaining mechanism.

DESCRIPTION OF THE EMBODIMENTS

Embodiments of the present disclosure will now be described with reference to the attached drawings. For convenience of illustration, each drawing shows only main components of a gear device in a simplified manner. The gear device shown in each drawing may include various components not shown.

Figure 1:
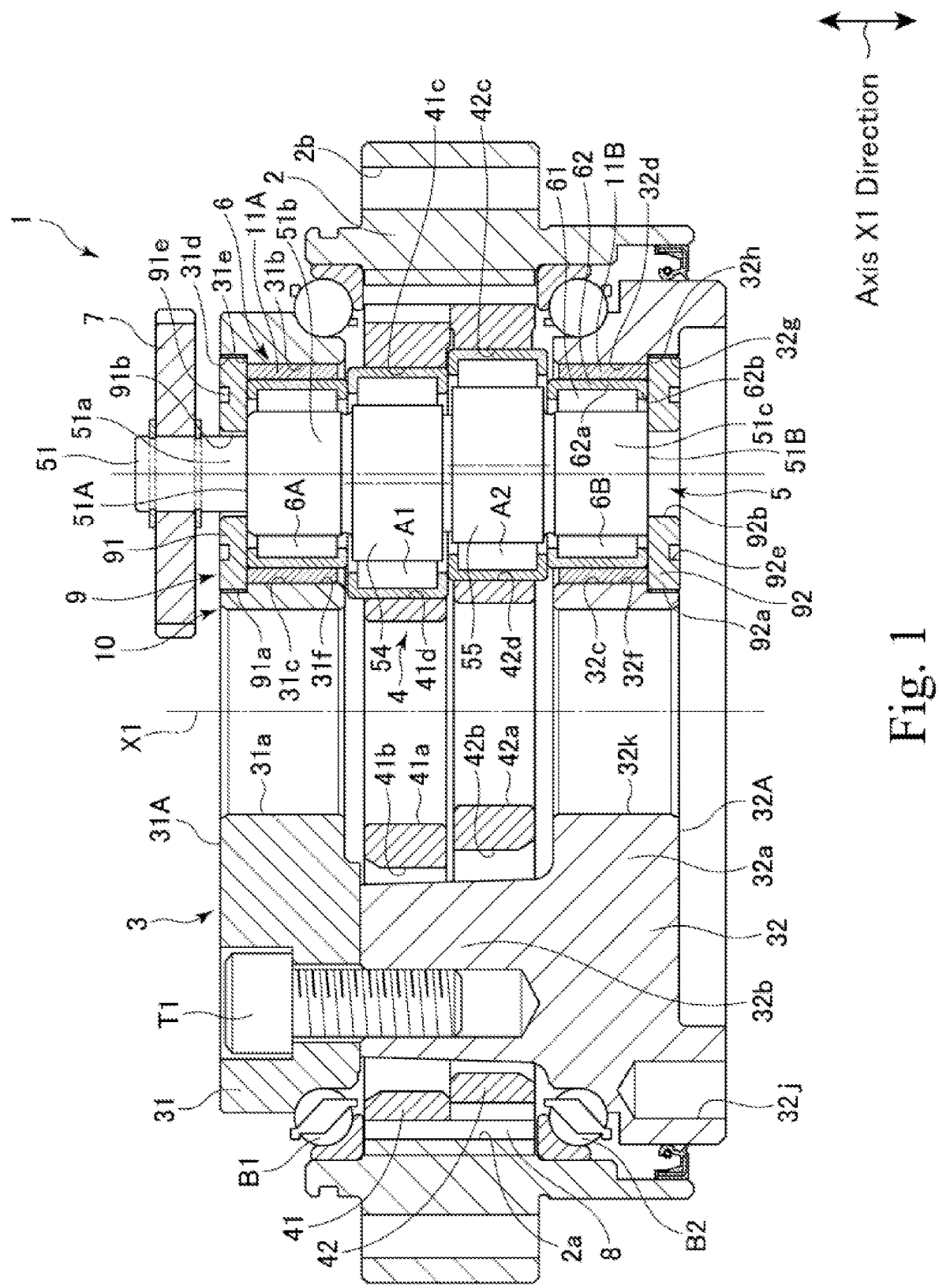
FIG. 1 is a sectional view illustrating a gear device containing a bearing retaining mechanism according to an embodiment of the present invention.

FIG. 1 shows an example of a bearing retaining mechanism 10 according to an embodiment of the present invention and a gear device 1 containing the bearing retaining mechanism 10. As shown, the gear device 1 is an eccentric oscillating gear device, for example. The gear device 1 includes an outer cylinder 2, a carrier 3, an oscillating gear 4, a crankshaft 5, and a crank bearing 6. The gear device 1 is configured such that when rotation of the crankshaft 5 causes oscillating rotation of the oscillating gear 4, the outer cylinder 2 and the carrier 3 rotate relatively to each other. The carrier 3 includes a first carrier member 31 and a second carrier member 32. The carrier 3 (that is, the first carrier member 31 and the second carrier member 32) is an example of "first member" recited in the claims.

The bearing retaining mechanism 10 includes: at least one of the first carrier member 31 and the second carrier member 32; the crankshaft 5; at least one of a rolling member 6A and a rolling member 6B; at least one of a bush 11A and a bush 11B; and a restriction member 9. The carrier member 31 has an inner peripheral surface 31c, and the carrier member 32 has an inner peripheral surface 32c. The inner peripheral surface 31c includes an internal screw portion 31d, and the inner peripheral surface 32c includes an internal screw portion 32g. The crankshaft 5 is rotatably supported on the inner periphery of the carrier 3. The restriction member 9 includes at least one of a first restriction member 91 and a second restriction member 92. The first restriction member 91 includes an external screw portion 91a, and the second restriction member 92 includes an external screw portion 92a. The external screw portion 91a is screwed on the internal screw portion 31d, and the external screw portion 92a is screwed on the internal screw portion 32g. The bush 11A is disposed between the first carrier member 31 and the rolling member 6A, and the bush 11B is disposed between the second carrier member 32 and the rolling member 6B. The inner periphery of the bush 11A includes a rolling surface for the rolling member 6A, and the inner periphery of the bush 11B includes a rolling surface for the rolling member 6B. The restriction member 9 screwed on the carrier 3 is supported by the first carrier member 31 and the bush 11A or by the second carrier member 32 and the bush 11B. The bush 11A and the bush 11B are examples of "second member" recited in the claims. The second member may be a member other than a bush.

In the bearing retaining mechanism 10 according to an embodiment of the present invention, a pressure acting on the bush 11A or the bush 11B upon fastening of the restriction member 9 is distributed to the first carrier member 31 or the second carrier member 32, and therefore, the pressure acting on the bush 11A or the bush 11B can be reduced. Thus, it is possible to inhibit deformation of the rolling surface of the bush 11A or the rolling surface of the bush 11B. This improves the durability of the bearing retaining mechanism 10.

Figure 2:
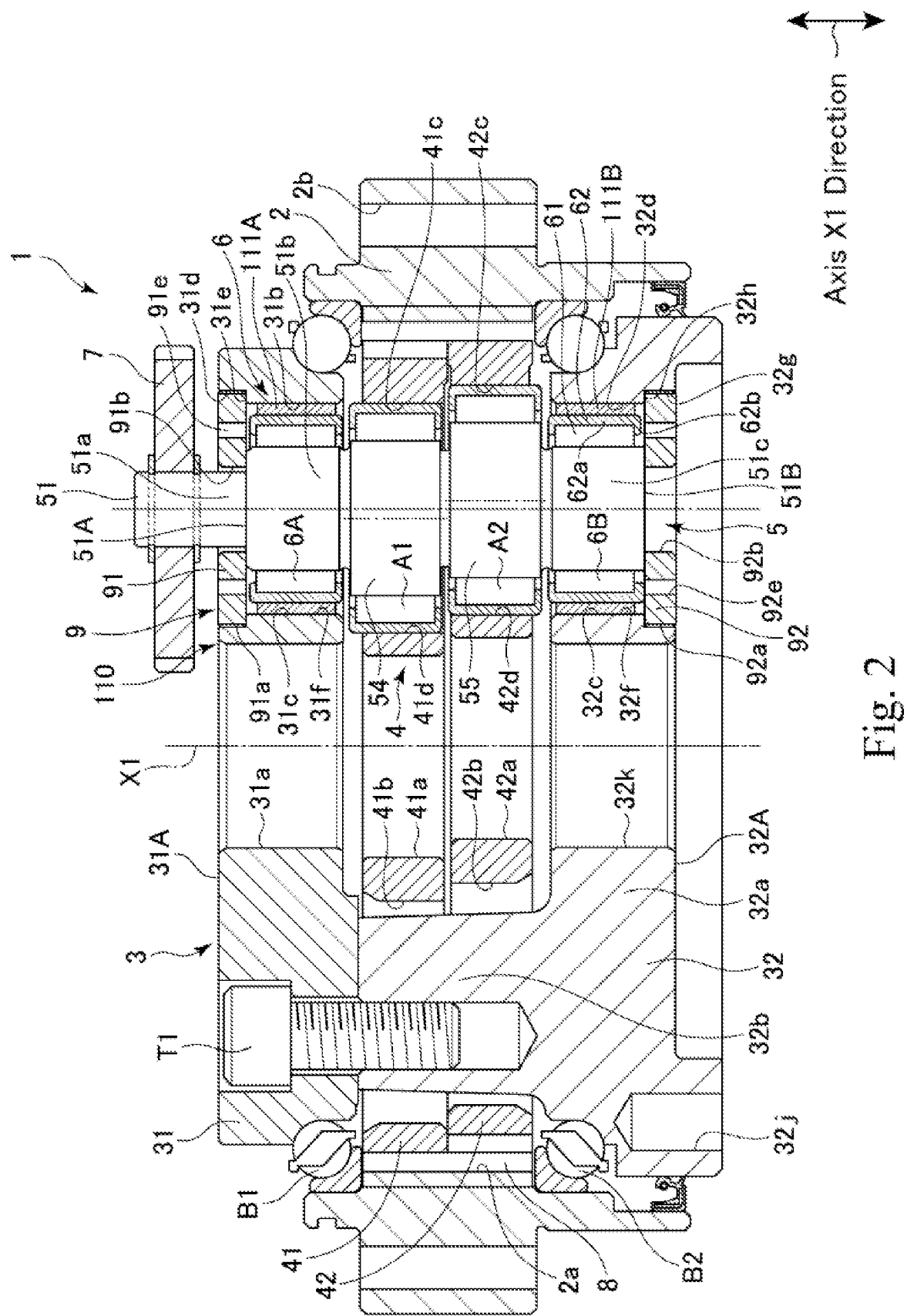
FIG. 2 is a sectional view illustrating a gear device containing a bearing retaining mechanism according to an embodiment of the present invention.
Figure 3:
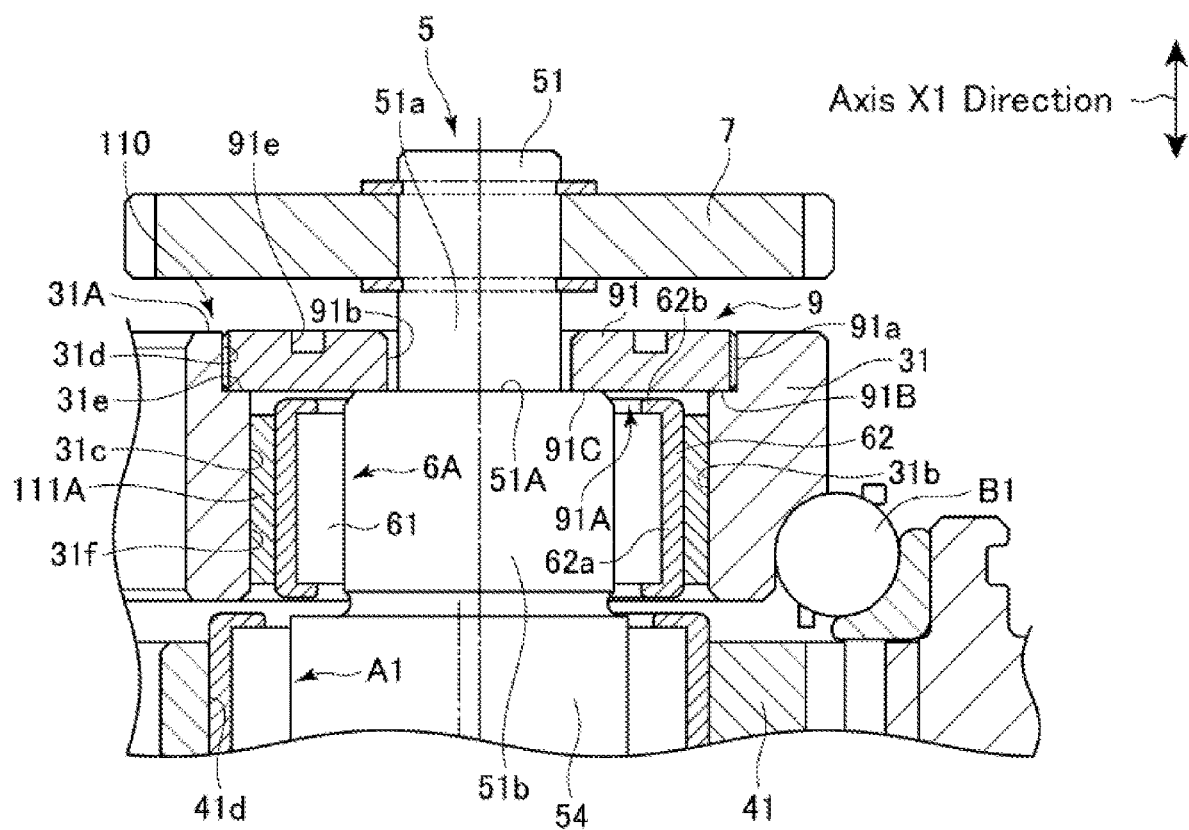
FIG. 3 is an enlarged view of a part of the bearing retaining mechanism shown in FIG. 2.

A bearing retaining mechanism 110 according to another embodiment of the present invention will be hereinafter described with reference to FIGS. 2 and 3. As shown, the bearing retaining mechanism 110 includes: the first carrier member 31 or the second carrier member 32; the crankshaft 5; the rolling member 6A or the rolling member 6B; a bush 111A or a bush 111B; and the restriction member 9. Description of the bearing retaining mechanism 110 will be omitted for the same configuration as in the bearing retaining mechanism 10. The bush 111A is disposed between the first carrier member 31 and the rolling member 6A, and the bush 111B is disposed between the second carrier member 32 and the rolling member 6B. The inner periphery of the bush 111A includes a rolling surface for the rolling member 6A, and the inner periphery of the bush 111B includes a rolling surface for the rolling member 6B. The restriction member 9 screwed on the carrier 3 is supported by the first carrier member 31 or the second carrier member 32. The bush 111A and the bush 111B are examples of "second member" recited in the claims.

In the bearing retaining mechanism 110, a gap is formed between the restriction member 9 and the bush 111A and/or between the restriction member 9 and the bush 111B. In other words, the bush 111A may be positioned to have a gap formed between the bush 111A and the first restriction member 91. Also, the bush 111B may be positioned to have a gap formed between the bush 111B and the second restriction member 92.

In the bearing retaining mechanism 110, a pressure produced upon fastening is received by the first carrier member 31 or the second carrier member 32, and therefore, it is possible to inhibit deformation of the rolling surface of the bush 111A or the rolling surface of the bush 111B. Further, because of the presence of the gap between the bush 111A or the bush 111B and the restriction member 9, the pressure from the restriction member 9 does not act directly on the bush 111A or the bush 111B, and therefore, it is possible to inhibit deformation of the rolling surface of the bush 111A or the rolling surface of the bush 111B. This improves the durability of the bearing retaining mechanism 110.

Next, a further description will be given of the gear device 1 shown in FIGS. 1 and 2. In the gear device 1, the outer cylinder 2 is formed in a substantially cylindrical shape centered at the axis X1. Multiple pin grooves are formed in an inner peripheral surface 2a of the outer cylinder 2. Each pin groove extends in the axis X1 direction and has a semicircular cross-sectional shape along the plane orthogonal to the axis X1 direction. The pin grooves are arranged in a circumferential direction of the outer cylinder 2 at regular intervals.

The gear device 1 further includes a plurality of inner-tooth pins 8 mounted on the inner peripheral surface 2a of the outer cylinder 2. Each of the inner-tooth pins 8 is formed in a circular columnar shape extending in the axis X1 direction. The inner-tooth pins 8 are mounted in the pin grooves formed in the inner peripheral surface 2a of the outer cylinder 2.

A plurality of mounting holes 2b are formed in the outer cylinder 2 so as to extend through the outer cylinder 2 in the axis X1 direction. The mounting holes 2b are arranged in the circumferential direction of the outer cylinder 2 at regular intervals. The mounting holes 2b are used for mounting a member constituting a joint portion of a robot (not shown) to the outer cylinder 2. For example, in mounting a base constituting a joint portion of a robot to the outer cylinder 2, the outer cylinder 2 serves as a fixed member in the gear device 1.

The carrier 3 is configured to hold the oscillating gear 4 at both sides in the axis X1 direction and disposed concentrically with the outer cylinder 2. The carrier 3 includes the first carrier member 31 and the second carrier member 32 opposed to each other in the axis X1 direction. The first carrier member 31 and the second carrier member 32 are fastened to each other via a fastening member T1.

The first carrier member 31 has a substantially disk-like shape. A part of the first carrier member 31 is positioned inside the outer cylinder 2, while a remaining part of the first carrier member 31 is positioned outside the outer cylinder 2 in the axis X1 direction. The first carrier member 31 has a center hole 31a and a crankshaft mounting portion 31b formed therein. The center hole 31a is formed in the center portion of the first carrier member 31 so as to extend through the first carrier member 31 in the axis X1 direction.

The crankshaft mounting portion 31b receives the crankshaft 5 mounted thereto. A plurality of crankshaft mounting portions 31b are arranged on an outer side of the center hole 31a in a circumferential direction of the carrier 3. Each of the crankshaft mounting portions 31b is formed of a through-hole extending through the first carrier member 31 in the axis X1 direction or formed of a cavity in the first carrier member 31 concave in the axis X1 direction. Each of the crankshaft mounting portions 31b is formed so as to extend through the first carrier member 31 in the axis X1 direction. The first carrier member 31 has three crankshaft mounting portions 31b formed therein.

The second carrier member 32 includes a substantially disk-shaped substrate portion 32a and a shaft portion 32b extending from the substrate portion 32a to the first carrier member 31. A part of the substrate portion 32a is positioned inside the outer cylinder 2, while a remaining part of the substrate portion 32a is positioned outside the outer cylinder 2 in the axis X1 direction.

The substrate portion 32a has an end surface on the first carrier member 31 side in the axis X1 direction, and the shaft portion 32b extends from the end surface of the substrate portion 32a in the axis X1 direction. A plurality of shaft portions 32b are arranged in the circumferential direction of the carrier 3. In this embodiment, the second carrier member 32 includes three shaft portions 32b. The second carrier member 32 includes a center hole 32k, a crankshaft mounting portion 32d, and a mounting hole 32j.

The center hole 32k is formed in the center portion of the second carrier member 32 so as to extend through the substrate portion 32a of the second carrier member 32 in the axis X1 direction.

The crankshaft mounting portion 32d receives the crankshaft 5 mounted thereto. A plurality of crankshaft mounting portions 32d are arranged on an outer side of the center hole 32k in a circumferential direction of the carrier 3. Each of the crankshaft mounting portions 32d is formed of a throughhole extending through the substrate portion 32a in the axis X1 direction or a cavity formed in a part of the substrate portion 32a in the axis X1 direction. In the embodiment, each of the crankshaft mounting portions 32d is formed so as to extend through the substrate portion 32a of the second carrier member 32 in the axis X1 direction. The crankshaft mounting portions 32d are positioned so as to correspond to the positions of the crankshaft mounting portions 31b formed in the first carrier member 31.

The mounting hole 32j, which is formed in the second carrier member 32 in the axis X1 direction, is formed of a cavity in an end surface of the second carrier member 32 on the opposite side to the first carrier member 31. The mounting hole 32j is used for mounting a mating member such as a turning barrel forming a joint portion of a robot to the carrier 3. When the turning barrel forming a joint portion of a robot is mounted to the carrier 3, the carrier 3 serves as a rotating member in the gear device 1. For example, when a base forming a joint portion of a robot is mounted to the carrier 3, the turning barrel forming the joint portion of the robot is mounted to the outer cylinder 2, and therefore, the carrier 3 serves as a fixed member in the gear device 1 and the outer cylinder 2 serves as a rotating member in the gear device 1.

The gear device 1 further includes main bearings B1, B2. The main bearings B1, B2 are disposed between the outer peripheral surface of the carrier 3 and the inner peripheral surface 2a of the outer cylinder 2. More specifically, the main bearing B1 is disposed between the outer peripheral surface of the first carrier member 31 and the inner peripheral surface 2a of the outer cylinder 2, and the main bearing B2 is disposed between the outer peripheral surface of the substrate portion 32a of the second carrier member 32 and the inner peripheral surface 2a of the outer cylinder 2. The main bearings B1, B2 allow the relative rotations of the outer cylinder 2 and the carrier 3.

The crankshaft 5 is rotatably supported on the carrier 3 at the crankshaft mounting portions 31b, 32d. The gear device 1 further includes the crank bearing 6 that includes rolling members (crank bearings) 6A, 6B that allow rotation of the crankshaft 5 with respect to the carrier 3. The crankshaft 5 is supported on the carrier 3 via the crank bearings 6A, 6B. In this embodiment, three crankshafts 5 are arranged in the circumferential direction of the carrier 3. The number of the crankshafts 5 is not limited and can be changed as appropriate in accordance with an application of the gear device 1.

The crankshaft 5 includes a shaft main body 51 extending in the axis X1 direction and eccentric portions 54, 55 that are eccentric with respect to the shaft main body 51.

The shaft main body 51 includes first and second journal portions (large diameter portions) Sib, 51c and a small diameter portion 51a having a slightly smaller diameter than the first and second journal portions Sib, 51c.

The first journal portion 51b is positioned in the crankshaft mounting portion 31b of the first carrier member 31. The rolling member (the first crank bearing) 6A is mounted to the outer peripheral surface of the first journal portion 51b.

The second journal portion 51c has the same outer diameter as the first journal portion 51b. The second journal portion 51c is positioned in the crankshaft mounting portion 32d of the second carrier member 32. The rolling member (the second crank bearing) 6B is mounted to the outer peripheral surface of the second journal portion 51c.

The small diameter portion 51a is adjacent to the first journal portion 51b in the axis X1 direction and extends in the direction opposite to the second journal portion 51c. A part of the small diameter portion 51a is positioned outside the crankshaft mounting portion 31b. It is also possible that the first journal portion 51b extends from inside of the crankshaft mounting portion 31b to outside of the crankshaft mounting portion 31b, thereby to eliminate the small diameter portion 5l a.

The eccentric portions 54, SS are positioned between the first journal portion 51b and the second journal portion 51c in the axis X1 direction. The oscillating gear 4 is mounted to the eccentric portions 54, SS via eccentric portion bearings A1, A2, respectively. The eccentric portion bearings A1, A2 allow relative rotations of the eccentric portions 54, SS and the oscillating gear 4.

The oscillating gear 4 is positioned in the outer cylinder 2 and interposed between the first carrier member 31 and the substrate portion 32a of the second carrier member 32 in the rotation axis X1 direction. The gear device 1 further includes the eccentric portion bearings A1, A2, and the oscillating gear 4 includes a first oscillating gear 41 mounted to the first eccentric portion 54 via the eccentric portion bearing A1 and a second oscillating gear 42 mounted to the second eccentric portion SS via the eccentric portion bearing A2. The oscillating gears 41, 42 each have an outer diameter slightly smaller than an inner diameter of the outer cylinder 2 and have a plurality of outer teeth formed on the outer peripheral surface thereof. The number of the outer teeth formed on the outer peripheral surface of each of the oscillating gears 41, 42 is slightly smaller than the number of the inner-tooth pins 8. Thus, the first oscillating gear 41 and the second oscillating gear 42 can perform oscillating rotation out of phase with each other so that the outer teeth are engaged with the inner-tooth pins 8 inside the outer cylinder 2.

The first oscillating gear 41 has formed therein a center hole 41a corresponding to the position of the center hole 31a of the first carrier member 31, an insertion hole 41b into which the shaft portion 32b is inserted, and a crankshaft mounting portion 41c into which the first eccentric portion 54 is inserted.

The second oscillating gear 42 has formed therein a center hole 42a corresponding to the position of the center hole 32k of the second carrier member 32, an insertion hole 42b into which the shaft portion 32b is inserted, and a crankshaft mounting portion 42c into which the second eccentric portion 55 is inserted.

In this embodiment, the oscillating gear 4 includes two oscillating gears, that is, the first oscillating gear 41 and the second oscillating gear 42, but this is not limitative. It is also possible that the oscillating gear 4 includes only one oscillating gear or three or more oscillating gears.

The gear device 1 further includes a transmission gear 7 that transmits a drive force to the crankshaft 5 to rotate the crankshaft 5. It is possible that three transmission gears 7 are provided in association with the positions of the three crankshafts 5. In the axis X1 direction, the transmission gear 7 is positioned on an opposite side to the second carrier member 32, with the first carrier member 31 interposed therebetween. The transmission gear 7 is mounted to the small diameter portion 51a of the shaft main body 51 of the crankshaft 5. Movement of the transmission gear 7 in the axis X1 direction is restricted by retaining rings mounted to the small diameter portion 51a of the shaft main body 51, the retaining rings retaining opposite sides of the transmission gear 7 in the axis X1 direction.

In the axis X1 direction, the transmission gear 7 is positioned on an opposite side to the second carrier member 32, with the first carrier member 31 interposed therebetween, but this is not limitative. It is also possible that the transmission gear 7 is positioned, for example, between the first eccentric portion 54 and the second eccentric portion 55. That is, the transmission gear 7 may be positioned in any way, and its position can be changed as appropriate in accordance with aspects of the gear device 1.

The transmission gear 7 includes a plurality of outer teeth on the outer peripheral surface thereof, and the plurality of outer teeth are engaged with an input shaft or the like of a motor (not shown), such that a drive force (torque) of the motor is transmitted to the crankshaft 5. The eccentric portions 54, 55 of the crankshaft 5, which has received the drive force from the transmission gear 7, rotate to cause the oscillating rotation of the oscillating gear 4 in the outer cylinder 2 in accordance with the rotation of the eccentric portions 54, 55. Thus, the outer cylinder 2 and the carrier 3 rotate relative to each other.

The gear device 1 further includes the restriction member 9 that restricts movement of the crankshaft 5 in the axis X1 direction. The restriction member 9 includes the first restriction member 91 and the second restriction member 92 spaced from each other in the axis X1 direction. The first restriction member 91 and the second restriction member 92 are on opposite sides of the crankshaft 5 in the axis X1 direction. Thus, the first restriction member 91 and the second restriction member 92 restrict movement of the crankshaft 5 in the axis X1 direction. The bearing retaining mechanism 10 and the bearing retaining mechanism 110 are formed on both sides of the carrier 3 in the axis X1 direction of the gear device 1 shown in FIGS. 1 and 2. FIG. 3 shows the bearing retaining mechanism 110 on the upper side in the axis X1 direction of the gear device 1.

The first restriction member 91 has a disk-like shape and has an insertion hole 91b that extends through a center portion in the axis X1 direction. The diameter of the insertion hole 91b is slightly larger than that of the small diameter portion 51a and is smaller than that of the first journal portion Sib. As shown in FIG. 2, the first restriction member 91 is positioned such that the small diameter portion 51a is positioned in the insertion hole 91b.

The first restriction member 91 includes an external screw portion 91a for fixing the first restriction member 91 to the carrier 3. The external screw portion 91a is formed over the entire circumference of the outer periphery of the first restriction member 91.

The inner peripheral surface 31c of the first carrier member 31, which forms the crankshaft mounting portion 31b, includes an internal screw portion 31d, a step portion 31e, and a supporting portion 31f. In the embodiment, the internal screw portion 31d, the step portion 31e, and the supporting portion 31f are arranged in this order from an outer end surface 31A side of the first carrier member 31.

The internal screw portion 31d extends from an end of the inner peripheral surface 31c on the outer end surface 31A side to an intermediate portion of the inner peripheral surface 31c. The internal screw portion 31d is engaged with the external screw portion 91a. Thus, the restriction member 9 is mounted to the carrier 3.

The step portion 31e connects between the internal screw portion 31d and the supporting portion 31E The step portion 31e extends from an end of the internal screw portion 31d on the first oscillating gear 41 side in the axis X1 direction to the radial inside of the crankshaft 5. The step portion 31e is aligned with an axial end surface 51A of the first journal portion 51b in the direction perpendicular to the axis X1 direction, the axial end surface 51A being opposite to the eccentric portion 54.

The first restriction member 91 is in contact with the step portion 31e in the axis X1 direction at an outer periphery of the second principal surface 91A thereof. The first restriction member 91 is also in contact with an axial end surface 51A of the first journal portion 51b at a center portion of the second principal surface 91A thereof.

In the embodiment, a restriction surface 91C is in contact with the axial end surface 51A of the first journal portion 51b, but this is not limitative. It is also possible that the restriction surface 91C is positioned to leave a gap between the restriction surface 91C and the axial end surface 51A in the axis X1 direction. In such an arrangement, the step portion 31e is closer to the outer end surface 31A than is the axial end surface 51A in the axis X1 direction.

The supporting portion 31f extends from an inner end of the step portion 31e in the radial direction of the crankshaft 5 toward the first oscillating gear 41 along the axis X1 direction. The supporting portion 31f rotatably supports the first journal portion 51b via the rolling member (the first crank bearing) 6A, and the rolling member (the first crank bearing) 6A includes a rolling element 61 extending in the axis X1 direction. Since the rolling element 61 freely rotates between the supporting portion 31f and the first journal portion 51b, the crankshaft 5 can rotate relatively to the carrier 3.

The second restriction member 92 may have a disk-like shape, as does the first restriction member 91. The second restriction member 92 has an insertion hole 92b in a center portion thereof, as does the first restriction member 91. The second restriction member 92 includes an external screw portion 92a and a mounting portion 92e, as does the first restriction member 91. The inner peripheral surface 32c of the second carrier member 32, which forms the crankshaft mounting portion 32d, includes an internal screw portion 32g, a step portion 32h, and a supporting portion 32f, as does the inner peripheral surface 31c of the first carrier member 31. The rolling member (the second crank bearing) 6B includes the rolling element 61, as does the rolling member (the first crank bearing) 6A. Each of the second restriction member 92, the inner peripheral surface 32c of the second carrier member 32, and the rolling member (the second crank bearing) 6B is disposed symmetrically to the first restriction member 91, the inner peripheral surface 31c of the first carrier member 31, and the first crank bearing 6A, respectively, in the axis X1 direction. Therefore, detailed description will be omitted for the shapes and arrangements of the second restriction member 92, the inner peripheral surface 32c of the second carrier member 32, and the rolling member (the second crank bearing) 6B.

The second restriction member 92 is in contact with the step portion 32h in the axis X1 direction, and at this position, the second restriction member 92 faces an axial end surface 51B of the second journal portion 51c on the outer end surface 32A side. Thus, the second restriction member 92 restricts movement of the crankshaft 5 in the axis X1 direction toward the outer end surface 32A. The second restriction member 92 faces a second part 62b of a retainer 62 of the second crank bearing 6B in the axis X1 direction. Thus, the second restriction member 92 restricts movement of the retainer 62 in the axis X1 direction toward the outer end surface 32A. Further, the first and second restriction members 91, 92 have recesses 91e, 92e, respectively. The recesses 91e, 92e each receive a jig, and the first and second restriction members 91, 92 are rotated with a given fastening torque. These recesses may be through-holes as shown in FIG. 2, such that a lubricant passes through the through-holes to lubricate the bearings 6A, 6B.

The examples of the embodiments of the present invention have been described above. The above-described embodiments are not limited to the configurations described above and can be applied to various types of gear devices. It may also be possible that a part of the various features described in relation to any one of the above-mentioned various embodiments is applied to the gear device described in relation to another of the embodiments.

What is claimed is:
1. A bearing retaining mechanism, comprising:
   a first member having an inner peripheral surface including an internal screw portion; a second member disposed on the inner peripheral surface;
   a rolling member configured to be rotatable with respect to a rolling surface formed on the second member;
   a retainer configured to hold the rolling member;
   a crankshaft rotatably supported on the second member via the rolling member;
   a restriction member supported on the first member, the restriction member including an external screw portion screwed on the internal screw portion; and
   wherein only an empty axial gap is formed between both the second member and the restriction member and the retainer and the restriction member.
2. The bearing retaining mechanism of claim 1, wherein the second member is a bush.
3. The bearing retaining mechanism of claim 1,
   wherein the second member is configured to be rotatable with respect to the retainer.

* * * * *